US010668891B2

(12) United States Patent
Kajiwara et al.

(10) Patent No.: US 10,668,891 B2
(45) Date of Patent: Jun. 2, 2020

(54) SEAT BELT APPARATUS

(71) Applicant: HONDA MOTOR CO., LTD., Tokyo (JP)

(72) Inventors: Hideki Kajiwara, Wako (JP); Masahiro Kato, Wako (JP); Yuya Igarashi, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 67 days.

(21) Appl. No.: 15/991,081

(22) Filed: May 29, 2018

(65) Prior Publication Data
US 2018/0345902 A1 Dec. 6, 2018

(30) Foreign Application Priority Data

Jun. 2, 2017 (JP) ................................. 2017-110238

(51) Int. Cl.
B60R 22/24 (2006.01)
B60J 5/04 (2006.01)
B60R 22/34 (2006.01)
B60R 22/36 (2006.01)
B60R 22/02 (2006.01)

(52) U.S. Cl.
CPC ............. B60R 22/24 (2013.01); B60J 5/042 (2013.01); B60J 5/0427 (2013.01); B60R 22/023 (2013.01); B60R 22/36 (2013.01); B60R 2022/3402 (2013.01)

(58) Field of Classification Search
CPC .. B60R 22/24; B60R 2022/3402; B60J 5/042; B60J 5/0427
See application file for complete search history.

(56) References Cited

U.S. PATENT DOCUMENTS

| 3,993,328 | A | * | 11/1976 | Henderson | B60R 22/08 280/807 |
| 4,223,914 | A | * | 9/1980 | Usami | B60R 22/08 280/803 |
| 4,949,994 | A | * | 8/1990 | Zawisa | B60R 22/20 248/292.14 |
| 5,031,933 | A | * | 7/1991 | Hirasawa | B60R 22/08 280/801.1 |

FOREIGN PATENT DOCUMENTS

| JP | 58-000440 A | 1/1983 |
| JP | S61-040610 U | 11/1986 |
| JP | 2001-138864 A | 5/2001 |
| JP | 2014-196025 A | 10/2014 |

OTHER PUBLICATIONS

Japanese Office Action (w/ partial English translation) issued for Application No. 2017-110238 dated Oct. 12, 2018.

* cited by examiner

Primary Examiner — Paul N Dickson
Assistant Examiner — Joselynn Y Sliteris
(74) Attorney, Agent, or Firm — Thomas | Horstemeyer, LLP

(57) ABSTRACT

A seat belt apparatus provided in a front door of a vehicle, comprises a retractor provided in the front door and configured to retract a webbing for constraining an occupant so as to be pulled out, a belt anchor provided in the front door and attached with one end of the webbing, and a latch configured to engage the front door to a vehicle body. The latch is provided between the retractor and the belt anchor in a longitudinal direction of the vehicle body.

2 Claims, 4 Drawing Sheets

VEHICLE EXTERIOR SIDE

VEHICLE INTERIOR SIDE

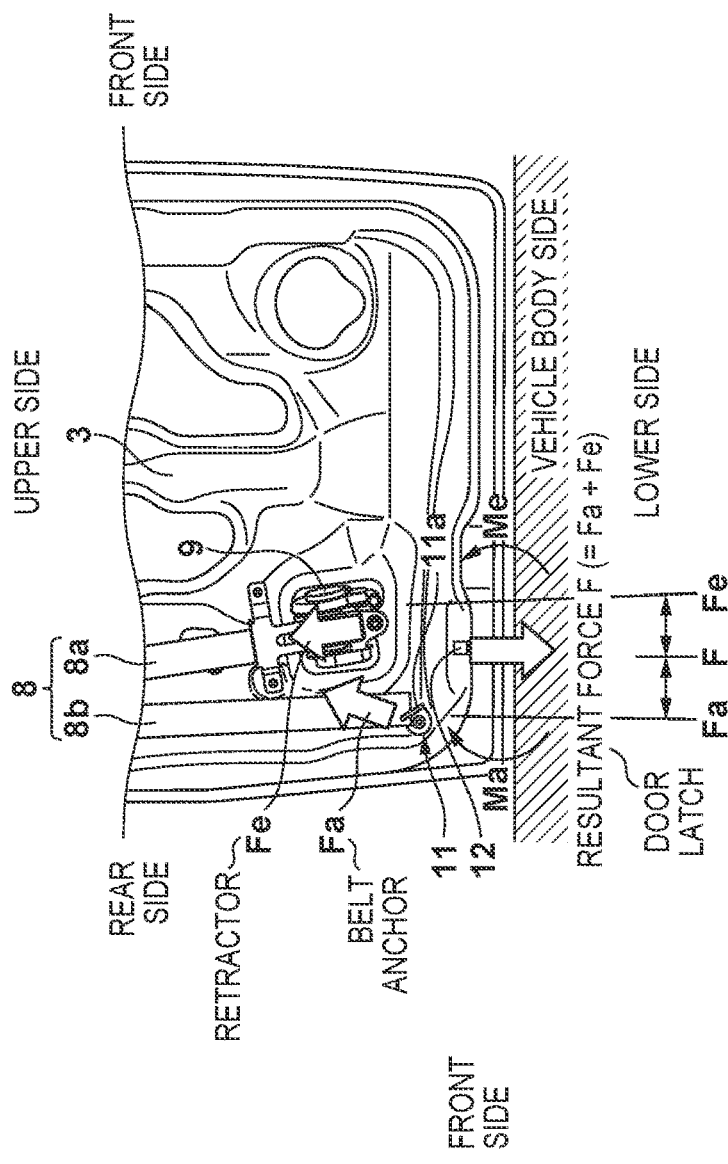
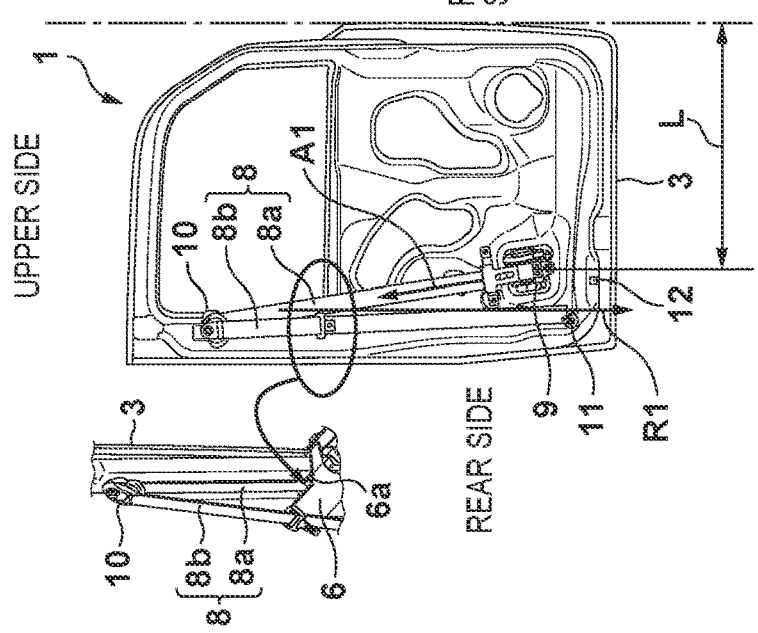
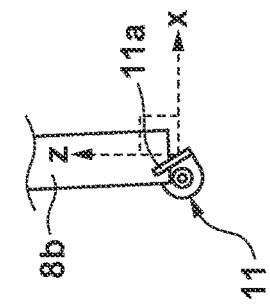

SEAT BELT APPARATUS

BACKGROUND OF THE INVENTION

Field of the Invention

The present invention relates to a seat belt apparatus provided in a front door of a vehicle.

Description of the Related Art

Japanese Utility Model Publication No. 61-40610 describes a structure in which a retractor 8 is arranged on the rear side with respect to a lower belt anchor 11 in a seat belt apparatus provided in a front door.

According to Japanese Utility Model Publication No. 61-40610, since the retractor 8 is arranged on the rear side with respect to the lower belt anchor 11, a moment at the time of opening/closing of the door is unwantedly large. In addition, since the retractor 8 is close to the lower portion of a belt outlet 10, if water enters, water may adhere to the retractor 8.

SUMMARY OF THE INVENTION

The present invention has been made in consideration of the aforementioned problems, and realizes a seat belt apparatus that can protect a belt anchor and a retractor.

In order to solve the aforementioned problems, the first aspect of the present invention provides a seat belt apparatus provided in a front door of a vehicle, comprising: a retractor provided in the front door and configured to retract a webbing for constraining an occupant so as to be pulled out; a belt anchor provided in the front door and attached with one end of the webbing; and a latch configured to engage the front door to a vehicle body, wherein the latch is provided between the retractor and the belt anchor in a longitudinal direction of the vehicle body.

According to the present invention, it is possible to protect a belt anchor and a retractor.

Other features and advantages besides those discussed above shall be apparent to those skilled in the art from the description of an embodiment of the invention as follows. In the description, reference is made to accompanying drawings, which form apart thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 2A is a view when viewed from the vehicle interior side in a state in which a door trim is removed from the door of the vehicle according to the present embodiment;

FIG. 2B is an enlarged view showing a portion around a seat belt retractor shown in FIG. 2A;

FIG. 2C is a view showing details of a belt anchor portion shown in FIG. 2B;

DESCRIPTION OF THE EMBODIMENTS

The structure of a vehicle body side portion according to an embodiment of the present invention will be described below with reference to the accompanying drawings.

<Door Structure>

An embodiment in which a seat belt apparatus according to the present invention is applied to a front door of a car will be described with reference to FIGS. 1A to 4.

Figure 1A:
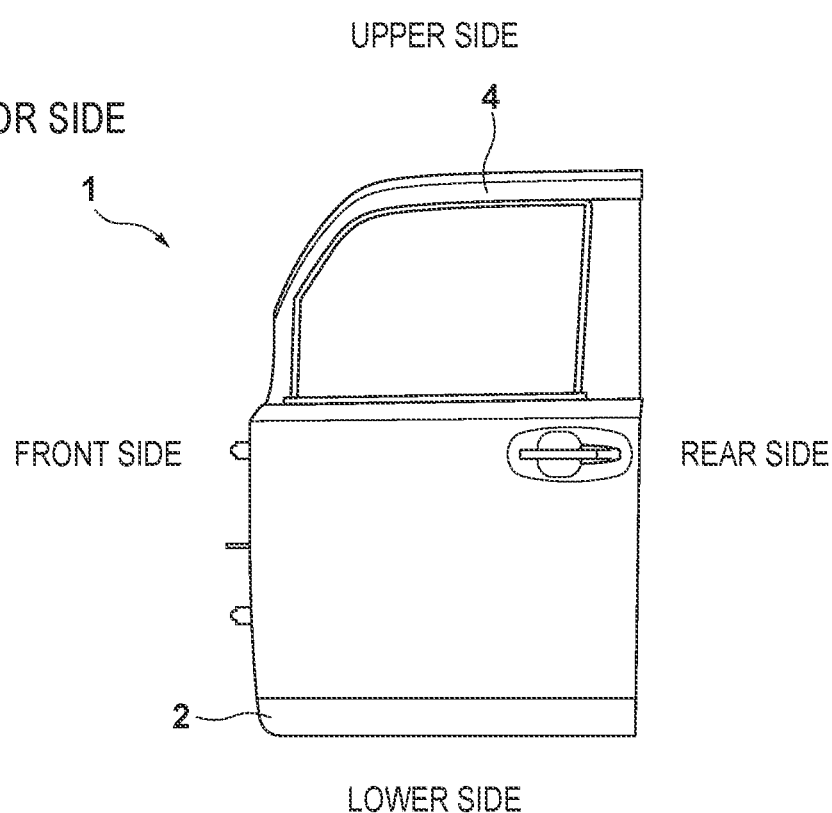
FIG. 1A is a view showing a door of a vehicle when viewed from the vehicle exterior side according to the present embodiment.
Figure 1B:
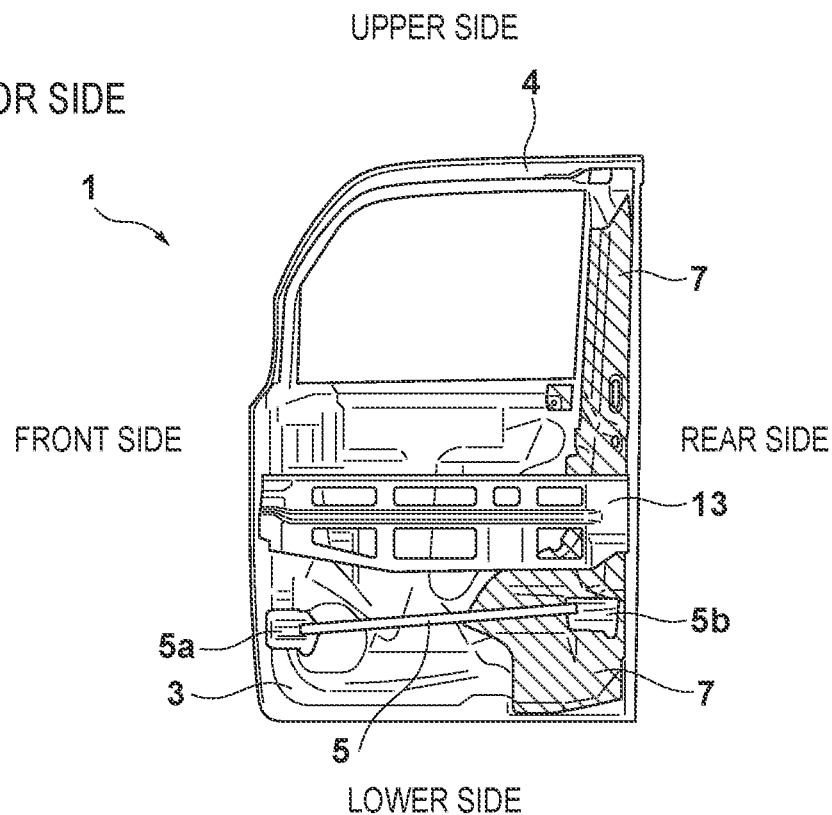
FIG. 1B is a view showing the door of the vehicle when viewed from the vehicle interior side according to the present embodiment.
Figure 3A:
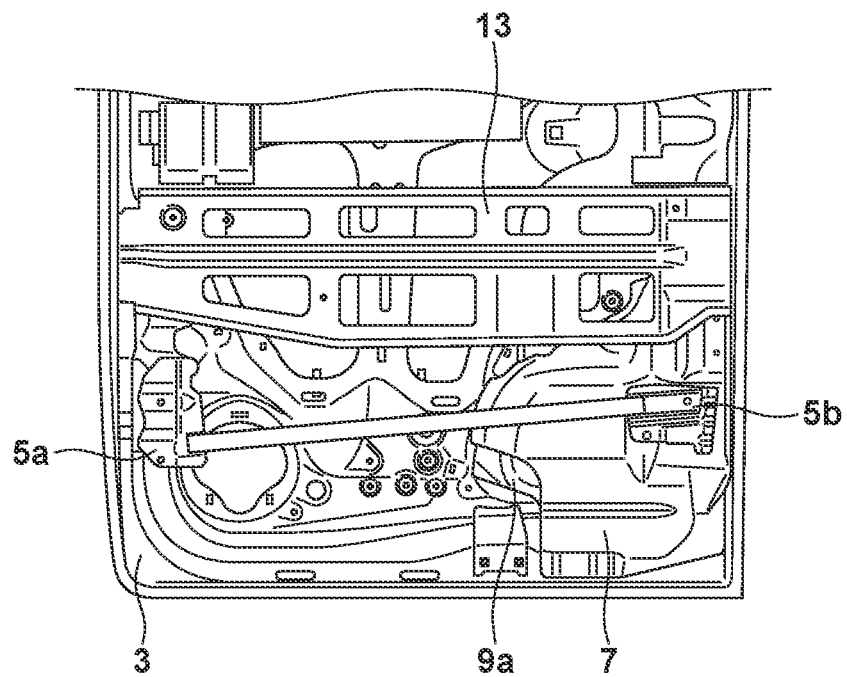
FIG. 3A is a view when viewed from the vehicle exterior side in a state in which an outer panel is removed from the door of the vehicle according to the present embodiment.
Figure 3B:
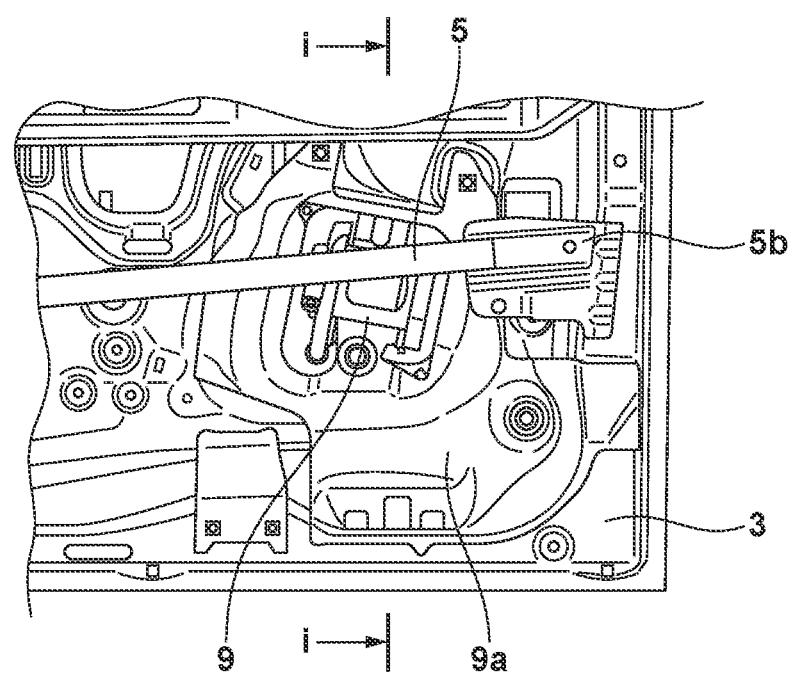
FIG. 3B is an enlarged view showing a portion around the seat belt retractor shown in FIG. 3A.
Figure 4:
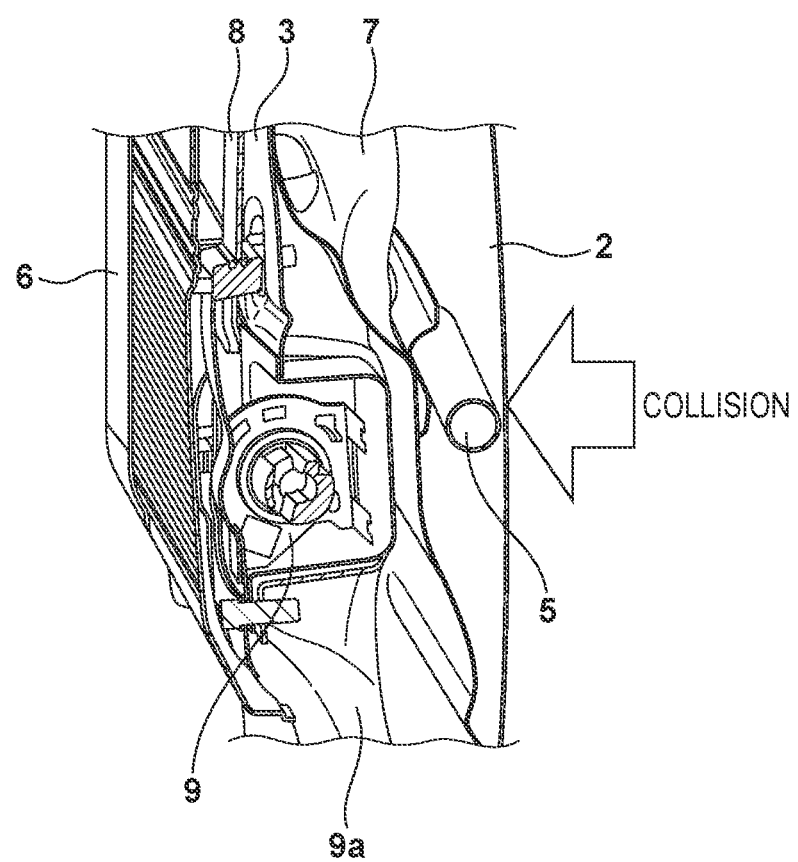
FIG. 4 is a sectional view taken along a line i-i in FIG. 3B.

FIG. 1A is a view showing a door of a vehicle when viewed from the vehicle exterior side according to the present embodiment. FIG. 1B is a view showing the door of the vehicle when viewed from the vehicle interior side according to the present embodiment. FIG. 2A is a view when viewed from the vehicle interior side in a state in which a door trim is removed from the door of the vehicle according to the present embodiment. FIG. 2B is an enlarged view showing a portion around a seat belt retractor shown in FIG. 2A. FIG. 2C is a view showing details of a belt anchor portion shown in FIG. 2B. FIG. 3A is a view when viewed from the vehicle exterior side in a state in which an outer panel is removed from the door of the vehicle according to the present embodiment. FIG. 3B is an enlarged view showing a portion around the seat belt retractor shown in FIG. 3A. FIG. 4 is a sectional view taken along a line i-i in FIG. 3B.

Note that the present embodiment will describe a seat belt apparatus provided in a door on the passenger seat side among the doors of the car. The present invention, however, is not limited to this, and is applicable to a door on the driver's seat side and left and right doors (including slide doors) on the rear seat side.

The vehicle according to the present embodiment is a so-called pillarless vehicle that is provided with no center pillar between a front door and a rear door for opening/closing an opening portion of a vehicle body side portion that makes the inside and outside of a cabin communicate with each other, and forms, in the vehicle body side portion, one continuous opening through which it is possible to access both a front seat and a rear seat in a state in which the front door and the rear door are open.

A door 1 according to the present embodiment is applied to, for example, a door on the passenger seat side of a keicar (light car/mini-vehicle) or the like. The door 1 includes an outer panel 2 on the outer side in the vehicle width direction (the vehicle exterior side) and an inner panel 3 on the inner side in the vehicle width direction (the vehicle interior side). A window frame portion 4 is formed in the upper portion of the inner panel 3. A beam member 5 extending in the width direction (the longitudinal direction of the vehicle body) of a panel surface is provided on the vehicle exterior side of the inner panel 3. The beam member 5 is a long hollow cylindrical member that receives a collision load input from the vehicle body side portion, and extends from the front end to the rear end of the inner panel 3. A beam front end attachment portion 5a connected to the front end portion of the beam member 5 is attached to the inner panel 3, and a beam rear end attachment portion 5b connected to the rear end portion of the beam member 5 is attached to a reinforcing rigid member 7.

A reinforcing member 13 extending in the width direction (the longitudinal direction of the vehicle body) of the panel surface is provided above the beam member 5 on the vehicle exterior side of the inner panel 3. The reinforcing member 13 is a metal panel member that receives a collision load input from the vehicle body side portion, and has a width in the vertical direction of the vehicle body and extends from the front end portion to the rear end portion of the inner panel 3. The reinforcing member 13 has a front end portion attached to the front end portion of the inner panel 3 and a rear end portion attached to the rear end portion of the inner panel 3.

A door trim 6 is externally mounted on the vehicle interior side of the inner panel 3. The rigid member 7 is attached in the vertical direction of the vehicle body on the vehicle body rear side of the inner panel 3 and the window frame portion 4. The rigid member 7 is provided in the rear portion of the door to apply the same rigidity as that of a conventional center pillar.

A belt retracting device (to be referred to as a retractor hereinafter) 9 called an ELR (Emergency Locking Retractor) that can retract and pull out a seat belt 8 for constraining an occupant to a seat is provided in a rear end lower portion on the vehicle interior side of the inner panel 3. The retractor 9 is attached to the inner panel 3 by a member 9a with a support. The retractor 9 operates to retract the seat belt by a predetermined retracting force so as to allow the user to normally pull out the seat belt, and fixes, when acceleration of a predetermined value or more acts on the vehicle body or the seat belt at the time of sudden braking or a collision, the seat belt not to be pulled out any more.

The distal end portion of the seat belt 8 pulled out from the retractor 9 is inserted through a through ring 10 provided in a rear end upper portion of the window frame portion 4 of the inner panel 3, extends downward while being hooked into the through ring 10, and is attached to a belt anchor 11 provided in the rear end lower portion of the inner panel 3. A seat belt portion (to be referred to as an upstream-side webbing hereinafter) 8a on the upstream side, that extends upward from the retractor 9, is not perceived from the vehicle interior side since a portion below the window frame portion 4 exists between the inner panel 3 and the door trim 6, and a seat belt portion (to be referred to as a downstream-side webbing hereinafter) 8b on the downstream side, that extends downward from the through ring 10, is exposed to the vehicle interior side of the door trim 6 and can be used by an occupant sitting on a seat.

A door latch 12 that is engaged with a door anchor (not shown) provided on the vehicle body side to hold the door 1 in a closed state is provided in the rear end lower portion on the vehicle interior side of the inner panel 3. As shown in FIG. 2B, the door latch 12 is arranged below the retractor 9 and the belt anchor 11 when viewed from the vehicle interior side and is arranged between the retractor 9 and the belt anchor 11 in the longitudinal direction of the vehicle body. The door latch 12 can be engaged with and released from the door anchor (not shown) provided with an engaging pawl (not shown) on the vehicle body side.

<Detailed Structure of Seat Belt Apparatus>

The detailed structure of the seat belt apparatus according to the present embodiment will be described next with reference to FIGS. 2A to 4.

The seat belt apparatus according to the present embodiment includes the retractor 9, the seat belt 8 that can be retracted in and pulled out from the retractor 9, the through ring 10, and the belt anchor 11, and these units are attached to the inner panel 3, as will be described later.

The retractor 9 is arranged on the front side of the vehicle body with respect to the belt anchor 11. As shown in FIG. 2A, a belt passage hole 6a for passing, toward the through ring 10, the upstream-side webbing 8a of the seat belt 8 pulled out from the retractor 9 is formed in the door trim 6 provided on the vehicle interior side of the inner panel 3. However, since the retractor 9 is arranged on the front side of the vehicle body with respect to the belt anchor 11, the retractor 9 is shifted to the front side of the vehicle body so as to avoid a path R1 through which, when rainwater or the like enters the belt passage hole 6a, water dropping downward passes, thereby making it possible to reduce the possibility that water directly adheres to the retractor 9.

As indicated by an arrow A1 in FIG. 2A, the retractor 9 is arranged obliquely in the vertical direction from the front side to the rear side of the vehicle body so that the seat belt 8 pulled out from the retractor 9 is pulled out from the retractor 9 toward the upper rear side of the vehicle body. In other words, the retractor 9 (a belt retracting shaft (not shown)) is arranged obliquely so that the upstream-side webbing 8a extending in the vertical direction from the retractor 9 to the through ring 10 is inclined from the front side to the rear side of the vehicle body when viewed from the vehicle interior side. As described above, by arranging the retractor 9 so that the seat belt 8 pulled out from the retractor 9 is pulled out obliquely upward, an area where the seat belt 8 (upstream-side webbing 8a) overlaps a glass window can be decreased, thereby widening the visual field of the occupant.

As shown in FIG. 2C, the belt anchor 11 is fastened to the rear end lower portion of the inner panel 3 so that a portion 11a to which the distal end portion of the seat belt 8 is attached is directed to the front upper side of the vehicle body within a range of an angle (right angle) formed by an axis x facing the front side of the vehicle body and an axis z facing the upper side of the vehicle body. As shown in FIG. 2B, the tension of the seat belt 8 generated when the occupant is constrained at the time of a collision acts on the retractor 9 and the belt anchor 11 as tensile loads Fe and Fa. A resultant force F of the tensile loads Fe and Fa is transmitted efficiently to the vehicle body through the door latch 12 and the door anchor (not shown) on the vehicle body side. More specifically, the tensile load Fe acting on the retractor 9 and the tensile load Fa acting on the belt anchor 11 generate moments Me and Ma in a door panel (inner panel 3), respectively. The directions of the moments are opposite to each other, and thus the moments cancel each other. As described above, the structure in which the tension of the seat belt 8 acts on the retractor 9 and the belt anchor 11 as the tensile loads Fe and Fa at the time of a collision and the moments Me and Ma generated by these loads cancel each other is adopted, thereby reducing the necessity to increase the rigidity of the door panel. It is thus possible to reduce the weight of the overall door by an amount corresponding to setting of low rigidity.

As shown in FIG. 2B, the door latch 12 is arranged below the retractor 9 and the belt anchor 11 when viewed from the vehicle interior side, and is arranged between the retractor 9 and the belt anchor 11 in the longitudinal direction of the vehicle body. This can shorten a distance L, shown in FIG. 2A, between the retractor 9 and the front end portion (door hinge) of the door in the longitudinal direction of the vehicle body. By arranging the heavy load in the door close to the door hinge in this way, the moment at the time of opening/closing of the door can be minimized, and a load necessary for an operation of opening/closing the door can be reduced, thereby improving the operability at the time of opening/closing of the door.

As shown in FIGS. 3A, 3B, and 4, the beam member 5 (more specifically, a beam portion on the side of the beam rear end attachment portion 5b) and the retractor 9 are arranged to overlap each other in the side view of the vehicle body (when viewed from the vehicle width direction). In this way, the retractor 9 is protected not to be damaged by a collision load input from the vehicle body side portion.

According to the above-described embodiment, in the seat belt apparatus, the retractor 9 in the door, the seat belt 8, and the belt anchor 11 do not overlap each other when viewed from the vehicle width direction, and the retractor 9 is arranged on the front side with respect to the belt anchor 11. This can reduce the possibility that water adheres to the retractor 9 when water enters the door. In addition, it is possible to decrease the moment at the time of opening/closing of the door, thereby improving the operability.

Furthermore, the seat belt 8 pulled out from the retractor 9 is pulled out toward the through ring 10 arranged on the vehicle body upper rear side of the door panel. This decreases the area where the seat belt 8 (upstream-side webbing 8a) pulled out from the retractor 9 overlaps the glass window.

The belt anchor 11 is fastened to the inner panel 3 so that the portion 11a to which the distal end portion of the seat belt 8 (downstream-side webbing 8b) is attached is located to face in a direction between the front side and upper side of the vehicle body. Thus, the seat belt 8 is pulled out from the retractor 9 toward the rear side, and the belt anchor 11 is fastened to face the front side of the vehicle body, thereby implementing the structure in which the moments Me and Ma generated when the tension of the seat belt 8 acts on the retractor and the belt anchor 11 at the time of a collision cancel each other.

Furthermore, when the door latch 12 provided in the lower portion of the inner panel 3 is located between the belt anchor 11 and the retractor 9, a collision load can be transmitted from the door latch 12 to the vehicle body side, thereby protecting the belt anchor 11 and the retractor 9.

Note that the above-described embodiment is an example of an implementation means of the present invention, and the present invention is applicable to a revision or a modification of the embodiment without departing from the scope of the present invention.

The structure of the vehicle body side portion according to the present embodiment is applicable to a vehicle other than a car, as a matter of course.

Summary of Embodiment

<First Aspect>

There is provided a seat belt apparatus 8, 9, 10, or 11 provided in a front door 1 of a vehicle, comprising:

a retractor 9 provided in the front door 1 and configured to retract a webbing 8 for constraining an occupant so as to be pulled out;

a belt anchor 11 provided in the front door 1 and attached with one end of the webbing 8; and a latch 12 configured to engage the front door 1 to a vehicle body, wherein the latch 12 is provided between the retractor 9 and the belt anchor 11 in a longitudinal direction of the vehicle body.

According to the first aspect, since a load is made to escape to the latch 12 at the time of a collision, it is possible to protect the belt anchor 11 and the retractor 9.

<Second Aspect>

There is provided the apparatus according to the first aspect, wherein the retractor 9 is arranged on a front side of the vehicle body with respect to the belt anchor 11.

According to the second aspect, it is possible to decrease a moment at the time of opening/closing of the door.

<Third Aspect>

There is provided the apparatus according to the second aspect, further comprising a through ring 10 provided in the front door 1 and through which the webbing 8 is inserted, wherein the webbing 8 pulled out from the retractor 9 is pulled out from the retractor 9 toward the through ring 10 provided on a rear side of the vehicle body and an upper side of the vehicle body.

According to the third aspect, the possibility that the webbing 8 pulled out from the retractor 9 overlaps a window is low, thereby making it possible to widen the visual field. Furthermore, it is possible to reduce the possibility that water adheres to the retractor when water enters.

<Fourth Aspect>

There is provided the apparatus according to the third aspect, wherein a portion of the belt anchor 11, to which the webbing 8 is attached, is fastened to face in a direction between the front side of the vehicle body and the upper side of the vehicle body.

According to the fourth aspect, since the webbing 8 is pulled out from the retractor 9 toward the rear side, and the belt anchor 11 is fastened to face the front side of the vehicle body, moments Me and Ma generated at the time of a collision can cancel each other.

What is claimed is:

1. A seat belt apparatus provided in a front door of a vehicle, comprising:

a retractor provided in the front door and configured to retract a webbing for constraining an occupant so as to be pulled out;

a belt anchor provided in the front door and attached with one end of the webbing; and a latch configured to engage the front door to a vehicle body; and a through ring provided in the front door and through which the webbing is inserted, wherein the retractor is arranged on a front side of the vehicle body with respect to the belt anchor, the webbing pulled out from the retractor is pulled out from the retractor toward the through ring provided on a rear side of the front door and an upper side of the front door, a portion of the belt anchor, to which the webbing is attached, is positioned to face a direction between the front side of the vehicle body and the upper side of the vehicle body, the latch is provided between a front end of a portion of which the retractor is fixed to the front door in a longitudinal direction of the vehicle body and a rear end of a portion of which the belt anchor is fixed to the front door in a longitudinal direction of the vehicle body.

2. The apparatus according to claim 1, wherein the retractor is provided in a rear end lower portion on a vehicle interior side of an inner panel of the front door, a rigid member is provided with the inner panel in a rear end of the front door, and the retractor is arranged obliquely in a vertical direction from the front side to the rear side of the vehicle body so that the webbing is pulled out from the retractor toward a rear side and an upper side of the vehicle.

* * * * *